(12) United States Patent
Saur et al.

(10) Patent No.: US 11,899,836 B2
(45) Date of Patent: Feb. 13, 2024

(54) METHOD FOR OPERATING A VISUALIZATION SYSTEM IN A SURGICAL APPLICATION, AND VISUALIZATION SYSTEM FOR A SURGICAL APPLICATION

(71) Applicant: Carl Zeiss Meditec AG, Jena (DE)

(72) Inventors: Stefan Saur, Aalen (DE); Christoph Hauger, Aalen (DE); Christoph Schaeff, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 1 day.

(21) Appl. No.: 17/529,044

(22) Filed: Nov. 17, 2021

(65) Prior Publication Data
US 2022/0164027 A1 May 26, 2022

(30) Foreign Application Priority Data
Nov. 25, 2020 (DE) ................... 10 2020 214 824.4

(51) Int. Cl.
*G06F 3/01* (2006.01)
*G06T 3/40* (2006.01)

(52) U.S. Cl.
CPC ............... *G06F 3/012* (2013.01); *G06T 3/40* (2013.01)

(58) Field of Classification Search
CPC .................. G06F 3/012; G06T 3/40
See application file for complete search history.

(56) References Cited

U.S. PATENT DOCUMENTS

| 8,020,993 B1* | 9/2011 | Fram ................. G06F 3/013 351/200 |
| 2014/0267420 A1* | 9/2014 | Schowengerdt ..... G02B 27/017 345/633 |
| 2016/0225192 A1* | 8/2016 | Jones ................. G06F 3/012 |
| 2017/0099479 A1* | 4/2017 | Browd ................ G06F 3/011 |
| 2020/0078099 A1* | 3/2020 | Luks ............... A61B 1/000095 |
| 2021/0244260 A1* | 8/2021 | Uyama ............. A61B 1/00048 |
| 2021/0386504 A1* | 12/2021 | Chen .................. H04N 5/2628 |

OTHER PUBLICATIONS

Zinchenko, K. et al., "Virtual Reality Control of a Robotic Camera Holder for Minimally Invasive Surgery," 2017 11th Asian Control Conference (ASCC), IEEE, pp. 970-975.
Mitall, A., "Novel Approach to Optimize Bandwidth Consumption for Video Streaming Using Eye Tracking," 2017 Master's Thesis in Electrical Engineering, KTH Royal Institute of Technology, Stockholm, Sweden, pp. 1-42.

* cited by examiner

*Primary Examiner* — Chanh D Nguyen
*Assistant Examiner* — Ngan T. Pham-Lu
(74) *Attorney, Agent, or Firm* — NIXON PEABODY LLP

(57) ABSTRACT

The invention relates to a method for operating a visualization system in a surgical application, wherein a registration device of the visualization system provides a video data stream with a first image size as an output, wherein an image excerpt of the video data stream with a second image size that has been reduced in relation to the first image size is transmitted to a head-mounted visualization device via a communications link and is displayed on a display device of the visualization device, wherein a viewing direction of a user is registered by means of a sensor system, and wherein the image excerpt of the video data stream is defined on the basis of the registered viewing direction. Further, the invention relates to a visualization system.

10 Claims, 5 Drawing Sheets

METHOD FOR OPERATING A VISUALIZATION SYSTEM IN A SURGICAL APPLICATION, AND VISUALIZATION SYSTEM FOR A SURGICAL APPLICATION

CROSS-REFERENCE TO RELATED APPLICATIONS

This application claims foreign priority under 35 U.S.C. § 119 to and the benefit of German Patent Application No. 10 2020 214 824.4, filed on Nov. 25, 2020, which is incorporated herein by reference in its entirety.

FIELD OF THE INVENTION

The invention relates to a method for operating a visualization system in a surgical application, and to a visualization system for a surgical application.

BACKGROUND

Visualization systems can assist surgeons during surgery. To this end, the visualization system registers a registration region by means of a registration device, for example a camera. A video data stream provided by the registration device is displayed in a visualization device mounted on the head, in particular in a head-mounted display (HMD). Such visualization systems are used, in particular, to be able to display a situs during surgery in a magnified fashion or together with additional information.

SUMMARY OF THE INVENTION

The invention is based on the object of developing a method for operating a visualization system in a surgical application and a visualization system for a surgical application, in which, in particular, it is possible to reduce an amount of data to be transmitted to the visualization device.

According to the invention, the problem is solved by a method having the features of patent claim 1 and a visualization system having the features of patent claim 10. Advantageous configurations of the invention emerge from the dependent claims.

It is one of the basic concepts of the invention to reduce an image size of a video data stream to be transferred to a defined image excerpt in order thereby to reduce an amount of data which should be transmitted to the head-mounted visualization device. In this case, the image excerpt is defined on the basis of a viewing direction of a user of the head-mounted visualization device. To this end, the viewing direction is registered and/or determined by means of a sensor system. Based on the video data stream, which is provided by a registration device of a visualization system with a first image size, the image excerpt is generated with a second image size that has been reduced in relation to the first image size and a video data stream that has been reduced to the defined image excerpt is transmitted to the head-mounted visualization device and is displayed by the latter on a display device. Expressed differently, the method and the visualization system can be used to define and alter, in particular dynamically, on the basis of the viewing direction of the user, a field of view of the user displayed by means of the display device. In this way, the image excerpt can pass over the entire height and width of the video data stream by altering the viewing direction of the user, and so the user can register all regions of the video data stream in targeted fashion.

In particular, a method for operating a visualization system in a surgical application is provided, wherein a registration device of the visualization system provides a video data stream with a first image size as an output, wherein an image excerpt of the video data stream with a second image size that has been reduced in relation to the first image size is transmitted to a head-mounted visualization device via a communications link and is displayed on a display device of the visualization device, wherein a viewing direction of a user is registered by means of a sensor system, and wherein the image excerpt of the video data stream is defined on the basis of the registered viewing direction.

Further, in particular, a visualization system for a surgical application is developed, comprising: a registration device, a communications link, a head-mounted visualization device with a display device, and a sensor system which is configured to register a viewing direction of a user, and a control device, wherein the registration device is configured to provide a video data stream with a first image size as an output, wherein the control device is configured to generate an image excerpt of the video data stream with a second image size that has been reduced in relation to the first image size and to transmit said image excerpt via the communications link to the visualization device, wherein the image excerpt of the video data stream is defined on the basis of the registered viewing direction, and wherein the visualization device is configured to display the transmitted image excerpt on the display device.

The method and the visualization system render it possible to reduce an amount of data to be transmitted, as a result of which it is also possible to reduce a bandwidth for data transfer in the direction of the visualization device. Additionally, it is possible to use in the visualization device a display device with a reduced number of pixels in relation to the video data stream provided. By way of example, if the registration device provides a video data stream with a (first) 4K UHD image size (e.g., 3840×2160 pixels), it is possible by means of the method described in this disclosure and the described visualization system to generate and display an image excerpt with a (second) full HD image size (e.g., 1920×1080 pixels) on the basis of the registered viewing direction of the user if the display device for example can only display in full HD. Since the image excerpt is defined on the basis of the registered viewing direction, it is nevertheless possible to display the full first image size (4K in this example) of the registration device of the visualization system to the user as required. In this case, the display can be controlled intuitively via the change in the viewing direction.

A further advantage of the method and the visualization system is that, in contrast to downscaling from the first image size to the second image size or the use of a fixedly specified image excerpt, the visualization system need not be moved when a viewing direction changes. By contrast, an image excerpt that has been correspondingly altered with the altered viewing direction can be generated and provided, at least in a region adjoining the previous image excerpt, by resorting to already registered adjoining image regions in the larger image size of the provided video data stream. This can avoid moving the registration system by means of an optionally present actuator system of the visualization system. As a consequence, tremors caused by the actuator system, which may still act after the actuation of the actuator system on account of mechanical vibration inertia, can likewise be avoided. Since the tremors transfer to the registration device and may lead to jitters in the registered video data stream, an annoying disturbance in the displayed image excerpt can be avoided, or at least reduced in terms of numbers, as a result of dispensing with an actuation of the actuator system.

In particular, on the basis of the registered viewing direction should mean that the registered viewing direction is the variable used to determine the region in which or where the image excerpt is defined.

The visualization system is, in particular, a visualization system which serves for visualization in medical, in particular surgical or microsurgical, operations. By way of example, the visualization system can be a surgical system, in particular a (robotic) surgical microscope. Alternatively, a surgical operation system, in particular a surgical microscope, can also comprise the visualization system. The visualization system comprises a registration system. The registration system is a camera, in particular, which registers a registration region with a first image size (e.g., 4K) and provides a corresponding video data stream. The camera can comprise an optical imaging device, by means of which a magnification and a focus can be set. Further, the visualization system can comprise an actuator system, by means of which at least one relative position, in particular a position and/or an alignment, of the registration device can be altered such that a position of the registration region of the registration device can be altered in this way. In that case, the visualization system can also be referred to as robotic visualization system. In particular, the actuator system can be in the form of a robotic stand of the registration device. The visualization system further comprises a control device and a head-mounted visualization device. The control device and the visualization device are interconnected via a wired or wireless communications link. The visualization device comprises a display device, on which a video data stream provided by the registration device is displayed with the second image size such that a user can register the latter. In particular, the visualization system is configured to display a situs during surgery, in particular in magnified fashion.

In particular, provision is made for a change in the viewing direction to be converted into a change in the image excerpt analogous thereto. By way of example, provision can be made for the number of pixels by which the image excerpt is displaced during the change in the viewing direction to be directly proportional to a change, in particular an angle change, in the viewing direction. An associated mapping rule or conversion function can be stored, for example, in a memory of the control device and can be taken into account when defining the image excerpt.

Provision can be made for the visualization system to register the registration region in two dimensions and provide a video data stream of two-dimensional images. Accordingly, an image excerpt is generated from the two-dimensional video data stream and displayed on the display device. However, provision can also be made for the visualization system to register the registration region in three dimensions, that is to say in stereoscopic fashion in particular, and provide a video data stream of three-dimensional images. Accordingly, an image excerpt is generated from the three-dimensional video data stream and displayed on the display device in three-dimensional fashion, that is to say in stereoscopic fashion. Transmission of the three-dimensional video data stream or of the image excerpt from the three-dimensional video data stream can be implemented, for example, in side-by-side, interlaced or sequential fashion.

In particular, the sensor system is arranged on the head-mounted visualization device or can be part of the visualization device. As an alternative or in addition thereto, the sensor system can also be arranged elsewhere. By way of example, provision can be made for the sensor system to be alternatively or additionally arranged at a suitable position in a room in which the visualization system is used.

The head-mounted visualization device is in the form of a head-mounted display (HMD), in particular. The visualization device can comprise the sensor system or part of the sensor system, which is configured to register a viewing direction of the user of the visualization device. By means of the visualization device it is possible, in particular, to additionally or alternatively display virtual information in the display device in addition to the video data stream that has been reduced to the second image size of the image excerpt. The visualization device can comprise further devices, for example a control device for controlling the display device, the sensor system and further devices should these be present. The visualization device can be battery-operated or fed by way of an external power supply. The visualization device can be configured to provide augmented reality (AR), mixed reality (MR) and/or virtual reality (VR).

In particular, provision is made for the method to be repeated cyclically. As a result, a (new or current) image excerpt can be defined continuously on the basis of the registered viewing direction and can be displayed on the display device.

Provision can be made for a transition to a (newly) defined image excerpt to be implemented continuously. The control device then determines a sequence of image excerpts which are located between the previously defined image excerpt and the newly defined image excerpt and transmits the determined sequence of image excerpts to the visualization device. This facilitates a smooth and intuitive registration of the (newly) defined image excerpt for a user. In particular, an abrupt change of the defined image excerpt can be avoided.

Parts of the visualization system, in particular the control device, can be embodied, either individually or together, as a combination of hardware and software, for example as program code that is executed on a microcontroller or microprocessor. However, provision can also be made for parts to be designed as application-specific integrated circuits (ASICs), either on their own or in combination.

In an embodiment, provision is made for the image excerpt to be only defined if the registered viewing direction remains constant for a specified minimum duration. This can ease the registration of the image excerpt by the user since not every change in the viewing direction is translated into a change of the image excerpt; instead, an (altered) image excerpt is only defined once the registered viewing direction remains constant for a specified minimum duration. In particular, this solves the problem of designing the use of the visualization device (e.g., HMD) to be more user-friendly, wherein in particular unintended and/or misguided changes to an image excerpt displayed on the display device of the visualization device are able to be avoided as a result. As a result thereof, the registration of the displayed image excerpt is, in particular, less tiresome for a user and produces less stress, and so incorrect perceptions can be reduced or can even be completely avoided. The specified minimum duration ranges, in particular, from several 100 milliseconds to a plurality of seconds, for example 1 to 2 seconds. Once the specified minimum duration has been exceeded, the image excerpt is (newly) defined. The control device generates a corresponding image excerpt from the video data stream and transmits it to the visualization device, which then displays the transmitted (newly) defined image excerpt on the display device.

In an embodiment, provision is made for a relative position of the head of a user of the visualization device to be registered by means of the sensor system, wherein the viewing direction is determined in consideration of the registered relative position of the head. In this case, a relative position can comprise an absolute position and/or alignment of the head. In particular, the direction in which the head of the user is directed can be determined thereby. In particular, what can be achieved hereby is that the user can define or alter an image excerpt by altering the relative position of the head. To this end, the sensor system can comprise a relative position sensor system, for example. A relative position sensor system in particular registers a relative position, that is to say an absolute position and an alignment, of the head-mounted visualization device (e.g., an HMD or AR glasses) in relation to a surround, that is to say, in particular, in relation to three-dimensional spatial coordinates of a coordinate system. As an alternative or in addition thereto, a change in the relative position in relation to the surround is determined by means of the relative position sensor system. By way of example, the relative position can be determined by means of inside-out tracking, wherein the relative position sensor system comprises a surround sensor system to this end. By means of the surround sensor system, in particular by means of a camera and/or depth sensors, it is possible to create a three-dimensional, geometric spatial model of the surround. By way of example, this is implemented by means of the simultaneous localization and mapping (SLAM) method, which is known per se. By means of the spatial model and inertial measurement units (IMUs) of the relative position sensor system it is then possible to determine the relative position of the visualization device in the surround. The relative position of the head is deduced from the determined relative position of the visualization device and the viewing direction is estimated in consideration of the relative position of the head. If the definition of the image excerpt is only defined by way of the relative position of the head, the image excerpt displayed on the display device can be altered in a manner particularly intuitive to a user since this corresponds to a natural change in the visual field as in the case of natural vision.

In an embodiment, provision is made for a line of sight to be registered by means of the sensor system, wherein the viewing direction is determined in consideration of the registered line of sight. As a result thereof, the image excerpt can be defined with the aid of the line of sight. To this end, the sensor system can comprise a line-of-sight sensor system, for example. By way of example, the line-of-sight sensor system comprises an eye/gaze tracking device. In the case of eye tracking (by means of an eye tracking sensor system), a line of sight of each eye of the user is registered and/or determined. In the case of gaze tracking (likewise by means of an eye tracking sensor system), a point of fixation of the eyes (i.e., where the two eye tracking lines intersect) is determined. Eye tracking is implemented in imaged-based fashion in particular. To this end, at least one camera, in particular at least one camera arranged at the visualization device, is directed at the eyes and images of the eyes are registered under weak infrared illumination. For evaluation purposes, the pupils of the eyes in the images are tracked by means of an algorithm and the line of sight for each of the eyes is determined, in particular estimated, therefrom. In this case, provision may be made for the eye/gaze tracking to have to be calibrated prior to the first application, wherein a user must direct their gaze in a targeted fashion at calibration points displayed or projected in the display device of the visualization device.

In an embodiment, provision is made for a position of a registration region of the registration device of the visualization system to be altered provided the defined image excerpt is located at least partly outside of a region which is imaged in the video data stream and which corresponds to the registration region of the registration device and the first image size. As a result, the image excerpt can also be displaced to regions located outside of the (current) registration region of the registration device. In particular, the registration region is altered with the aid of an actuator system of the visualization system. In this case, the change in the registration region is implemented in particular to the same extent as there is or was a change in the viewing direction, that is to say in particular directly proportional to any change in the viewing direction. The further the defined image excerpt is located outside of the previous registration region, the greater a change in the position of the registration region or of the registration device.

In this case, provision can be made for a change in the position of the registration region and/or of the registration device to be brought about immediately by a change in the viewing direction carried out to a corresponding extent, that is to say the position is altered without delay.

In an embodiment, provision is made for a resolution of the defined image excerpt to be reduced, at least for a portion of the defined image excerpt, prior to the transmission to the visualization device. This can further reduce the data volume.

In a developing embodiment, provision is made for the resolution to be reduced to an ever-greater extent, the further a pixel is away from an image center of the image excerpt. In particular, provision can be made for transmitted information in relation to the pixels always becoming less in the direction of edges of the image excerpt. Then, pixels on the display device for which no information has been transmitted are interpolated from the other pixels for which information was transmitted in each case.

In an embodiment, provision is made for the image excerpt to be defined upon startup and/or upon a reset of the visualization system to be an image center of the video data stream. As a result, what can be achieved upon startup and/or upon reset of the visualization system is that a user can also register regions adjoining the defined image excerpt by an appropriate change in the viewing direction without immediately requiring a position of the registration region of the registration device to be altered. This allows the user to quickly gain an overview and orient themselves.

In an embodiment, provision is made for changes in the registered viewing direction which are above a specified threshold to be recognized, with the changes above the specified threshold remaining unconsidered when defining the image excerpt and/or when changing the position of the registration device. As a result thereof, a change in the image excerpt registered or perceived as jerky, which is caused by a quick or abrupt change in the viewing direction, can be avoided. In particular, this solves the problem of designing the use of the visualization device (e.g., HMD) to be more user-friendly, wherein in particular unintended and/or misguided changes to an image excerpt displayed on the display device of the visualization device are able to be avoided as a result. As a result thereof, the registration of the displayed image excerpt is, in particular, less tiresome for a user and produces less stress, and so incorrect perceptions can be reduced or can even be completely avoided. For recognition purposes, a temporal change in the registered viewing direction is evaluated by means of the control device and compared to a specified threshold. If a comparison result yields that the change in the viewing direction over time is less than or equal to the specified threshold, the method as described in this disclosure is carried out and the image excerpt is (newly) defined. By contrast, if the comparison result yields that the change is above the specified threshold, there is no (renewed) definition of the image excerpt. By way of example, the specified threshold can be specified in absolute terms (e.g., angle per unit time or pixels per unit time) or in relative terms (e.g., 50% of the image excerpt per unit time).

Further features relating to the configuration of the visualization system arise from the description of configurations of the method. Here, the advantages of the visualization system are respectively the same as in the configurations of the method.

BRIEF DESCRIPTION OF THE DRAWINGS

The invention is explained in greater detail below on the basis of preferred exemplary embodiments with reference to the figures. In the figures.

DETAILED DESCRIPTION

Figure 1:
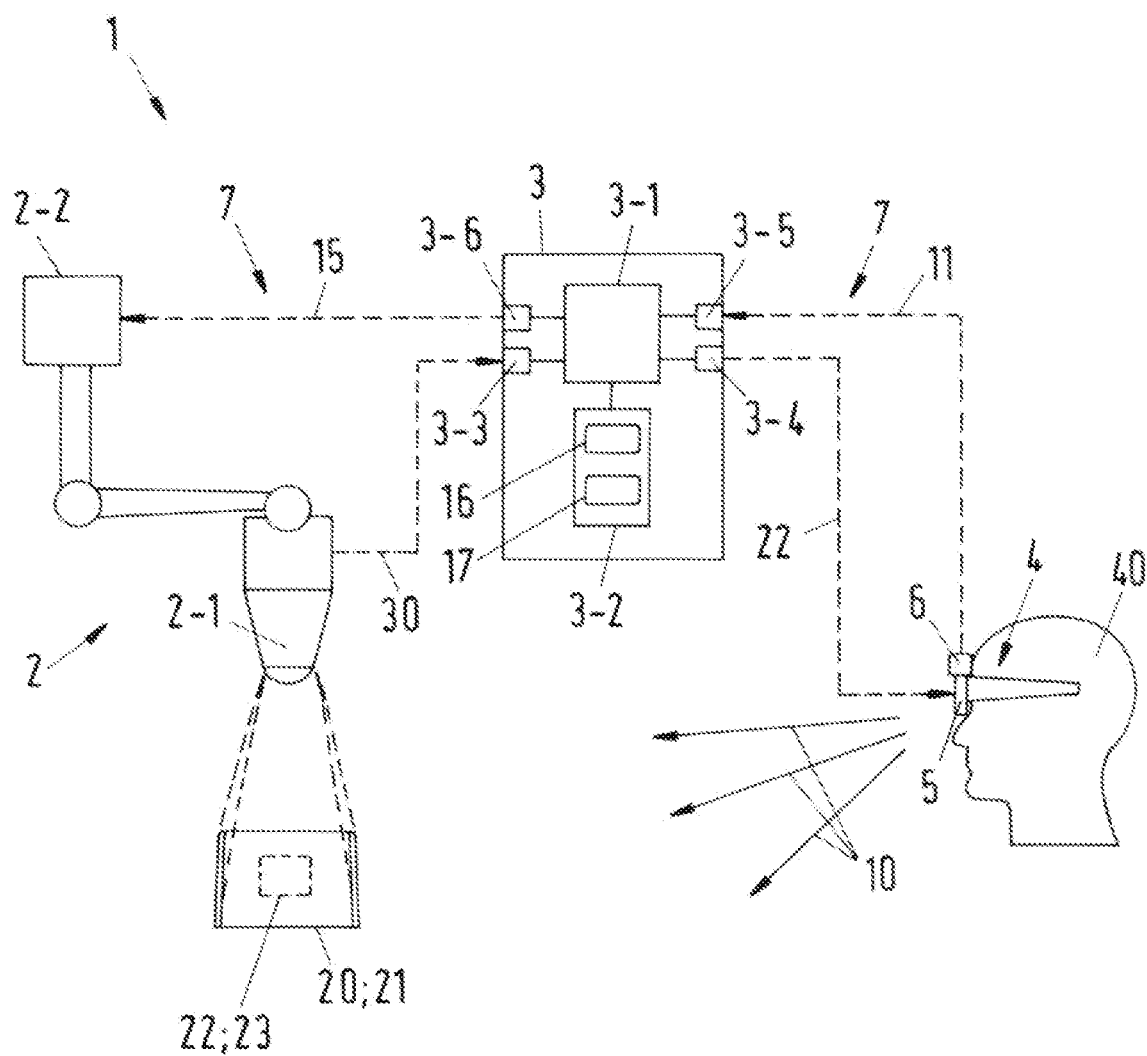
FIG. 1 shows a schematic illustration of an embodiment of the visualization system for a surgical application.

FIG. 1 shows a schematic illustration of an embodiment of the visualization system 1 for a surgical application. The visualization system 1 comprises a registration device 2, a control device 3 and a head-mounted visualization device 4 with a display device 5, and a sensor system 6. The registration device 2, the control device 3 and the visualization device 4 are interconnected via wired and/or wireless communications links 7. The method described in this disclosure is described in more detail below on the basis of the visualization system 1. In particular, the visualization system 1 is configured to carry out the method, described in this disclosure, for operating a visualization system 1 in a surgical application.

The registration device 2 comprises a camera 2-1, which may be in the form of a two-dimensional or three-dimensional camera 2-1. The camera 2-1 registers a registration region 20, which in one application of the visualization system 1 coincides in particular with a situs of a surgery such that the camera 2-1 registers the situs. The registration region 20 is registered with a first image size 21 (e.g., in 4K-UHD image size). As an output, the registration device 2 provides a video data stream 30 in the first image size 21. The video data stream 30 is transmitted to the control device 3. The registration device 2 can further comprise an actuator system 2-2, by means of which a position of the registration device 2 can be altered. In particular, the actuator system 2-2 allows a position of the registration region 20 to be altered.

The control device 3 comprises a computing device 3-1 and a memory 3-2. The computing device 3-1 can access data stored in the memory 3-2 and can carry out computing operations on the data. By way of example, the computing device 3-1 comprises a microprocessor on which program code can be executed in order to carry out method steps of the method.

The control device 3 receives the video data stream 30 via an interface 3-3. The control device 3-1 is configured to generate a defined image excerpt 22 of the video data stream 30 with a smaller image size 23 in relation to the first image size 21 and to transmit said image excerpt to the visualization device 4 via an interface 3-4 configured to this end and via the communications link 7. To this end, the computing device 3-1 cuts the defined image excerpt 22 with a smaller second image size 23 (e.g., full HD) in relation to the first image size 21 from the video data stream 30. For elucidation purposes, the defined image excerpt 22 is illustrated schematically within the registration region 20.

The visualization device 4 displays the image excerpt 22 on the display device 5. A user 40 of the visualization system 1, for example a surgeon, can then register the displayed image excerpt 22.

In this procedure, provision is made for the image excerpt 22 of the video data stream 30 to be defined on the basis of the registered viewing direction 10 of the user. To this end, the viewing direction 10 is registered by means of the sensor system 6. The sensor system 6 is arranged at the visualization device 4. As an alternative or in addition thereto, the sensor system 6 can also be arranged elsewhere, for example at a suitable position in a room in which the visualization system 1 is used.

The viewing direction 10 can be composed of a line of sight and a relative position of the head of the user. In this case, the viewing direction relates in particular to a stationary three-dimensional coordinate system relative to a surround in which the visualization system 1 is used. By way of example, eye/gaze tracking methods, known per se, are used to register the line of sight. To register or determine the relative position of the head it is possible to use inside-out methods, for example with the aid of a camera and/or depth camera, and/or inertial measurement units (IMUs) in a manner known per se. By way of example, the registered viewing direction 10 is transmitted as viewing direction signal 11 to the control device 3, which receives the viewing direction signal 11 by means of an interface 3-5 configured to this end. Then, the control device 3 considers the registered viewing direction 10 when defining the image excerpt 22.

Figure 2A:
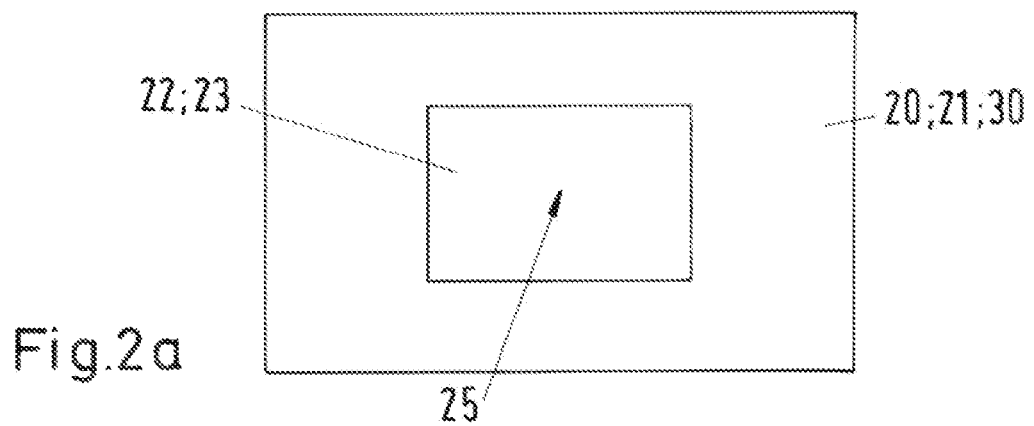
FIGS. 2a, 2b, 2c show schematic illustrations for elucidating the visualization system and the method.
Figure 2B:
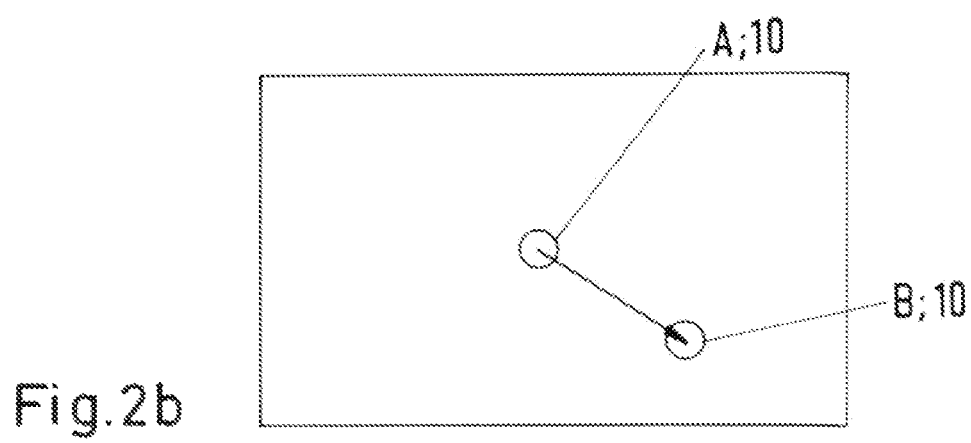
Figure 2C:
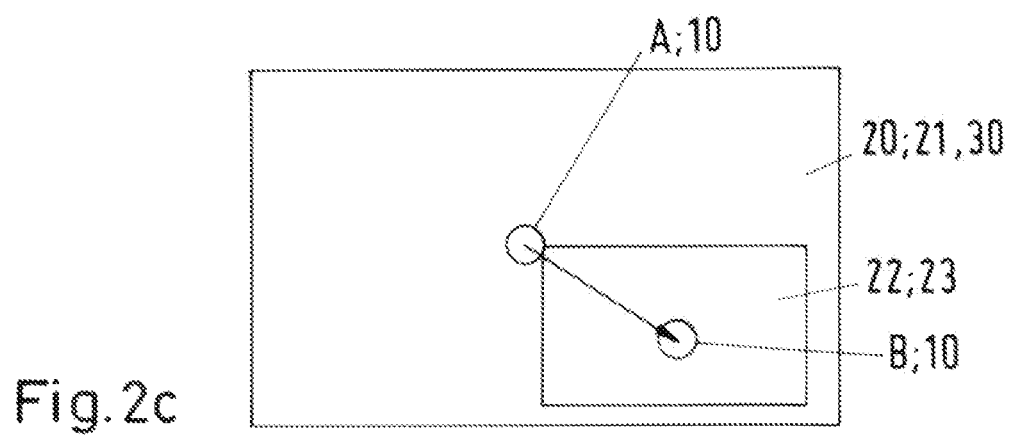

This is explained in more detail below on the basis of FIGS. 2a, 2b and 2c. FIGS. 2a, 2b and 2c show schematic illustrations of the registration region 20, which corresponds to the first image size 21 and the video data stream 30 generated by the registration device, and the generated image excerpt 22 with the second image size 23. In this case, it is assumed that the image excerpt 22 is or will be defined upon startup and/or upon a reset of the visualization system to be an image center 25 of the video data stream 30 (cf. FIG. 2a). An initially registered viewing direction then corresponds to the image center 25 upon startup and/or reset of the visualization system. The first image size 21 for example corresponds to the 4K format and the second image size 23, which is reduced in relation to the first image size, corresponds to the full HD format. In this case, the second image size 23 corresponds in particular to the image size of the display device of the visualization device of the visualization system.

A user of the visualization system or the visualization device subsequently changes their viewing direction from a point A (which corresponds to the image center 25) corresponding to the viewing direction 10 to a point B corresponding to the viewing direction 10 by changing the line of sight and/or by changing the relative position of the head (cf. FIG. 2b). This change in the viewing direction 10 is registered and the image excerpt 22 is defined in accordance with the registered altered viewing direction 10. As a result, the image excerpt 22 shifts away from the image center 25 into the lower right region of the registration region 20 of the registration device (FIG. 2c).

Within the registration region 20, the image excerpt 22 can be shifted freely by way of a change in the viewing direction 10 without the registration region 20 itself needing to be altered.

Provision can be made for a position of a registration region 20 of the registration device 2 (cf. FIG. 1) of the visualization system 1 to be altered provided the defined image excerpt 22 is located at least partly outside of a region which is imaged in the video data stream 30 and which corresponds to the registration region 20 of the registration device 2 and the first image size 21. Then, the control device 3 controls the actuator system 2-2 of the registration device 2 accordingly in order to alter a position of the registration region 20, and generates to this end an appropriate control signal 15 and transmits the latter to the actuator system 2-2 of the registration device 2 via the interface 3-6.

Figure 3A:
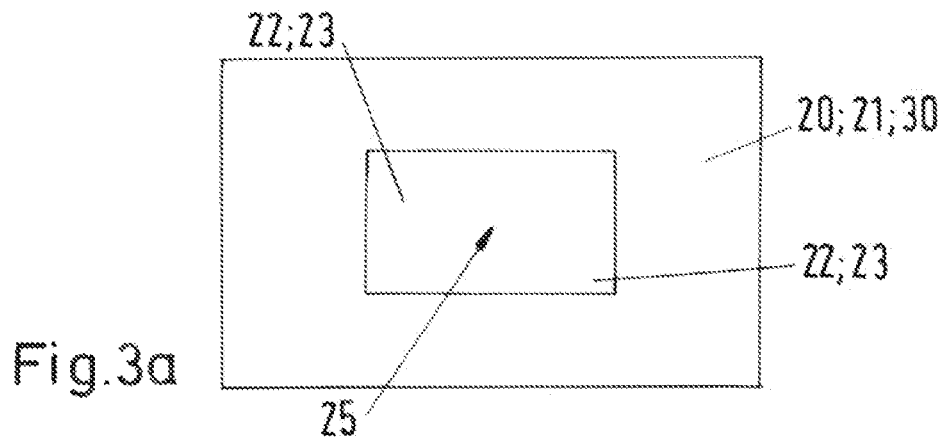
FIGS. 3a, 3b, 3c show schematic illustrations for elucidating an embodiment of the visualization system and the method.
Figure 3B:
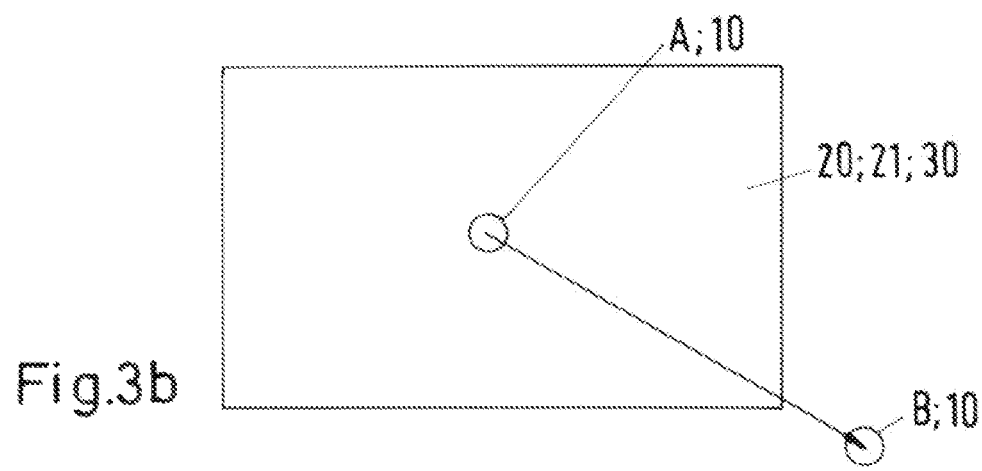
Figure 3C:
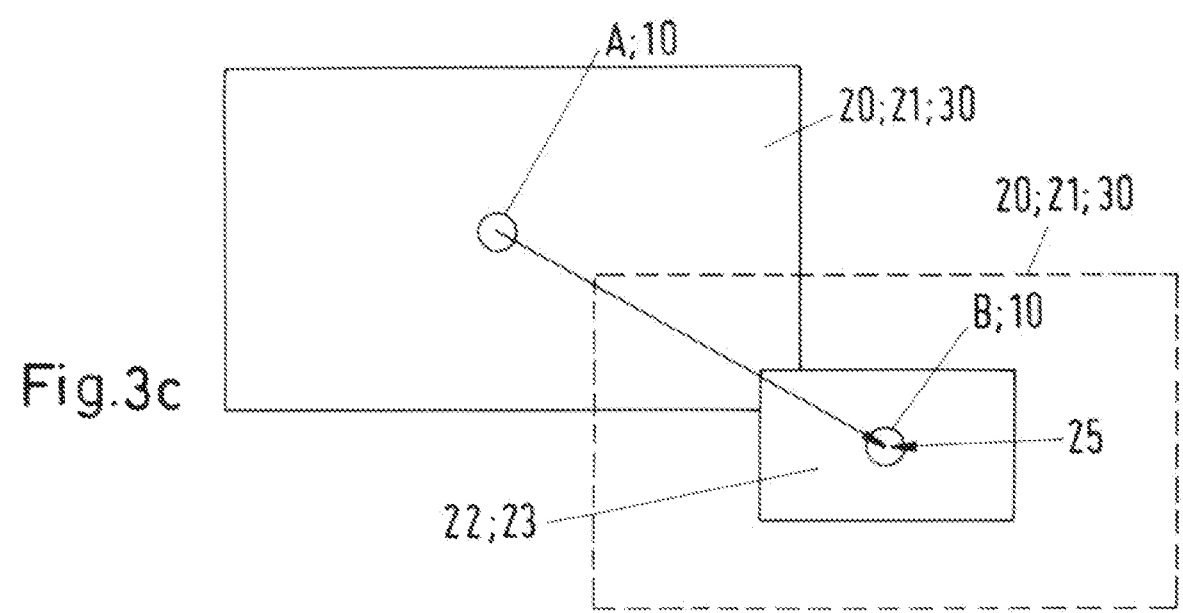

This is elucidated schematically in FIGS. 3a, 3b and 3c. The initial situation in FIG. 3a is the same as in FIG. 2a.

A user of the visualization system or the visualization device, based on the situation shown in FIG. 3a, changes their viewing direction 10 from a point A corresponding to the viewing direction 10 to a point B corresponding to the viewing direction 10 by changing the line of sight and/or by changing the relative position of the head (cf. FIG. 3b). This change in the viewing direction 10 is registered. In contrast to the situation shown in FIG. 2b, the change in the viewing direction 10 from point A to point B is, however, so large that point B is located outside of the registration region 20 of the registration device. Purely cutting out the image excerpt 22 corresponding to point B from the provided video data stream 30 is therefore not possible since a corresponding image excerpt 22 is not present in the video data stream 30. Therefore, provision is made for a position of a registration region 20 of the registration device 2 (cf. FIG. 1) of the visualization system 1 to be altered such that the video data stream 30 again comprises an image excerpt 22 corresponding to the viewing direction 10. To this end, an appropriate control signal is generated by means of the control device and transmitted to an actuator system of the registration device. In this case, provision can be made, in particular, for the actuator system of the registration device to be controlled in such a way that, following the change in position of the registration region 20, point B coincides with an image center 25 of the (altered) registration region 20. Then, the image excerpt 22 is defined in the altered registration region 20 or in the altered video data stream 30 resulting therefrom, and is displayed on the display device as already described above.

Provision can be made for the image excerpt 22 to be only defined if the registered viewing direction 10 remains constant for a specified minimum duration 16. To this end, the control device 3 determines for example how long the registered viewing direction 10 dwells in a region, in particular within a solid angle, by means of the viewing direction signal 11 and compares the determined duration to the specified minimum duration 16. The specified minimum duration 16 is stored in the memory 3-2, for example, and can be, for example, 1 to 2 seconds. Provision can be made for the specified minimum duration 16 to be able to be specified by the user.

Provision can be made for a resolution of the defined image excerpt 22 to be reduced, at least for a portion of the defined image excerpt 22, prior to the transmission to the visualization device 4. To this end, the control device 3 (FIG. 1) reduces a resolution of the image excerpt 22 in the at least one portion. By way of example, this portion can be an edge region.

Figure 4:
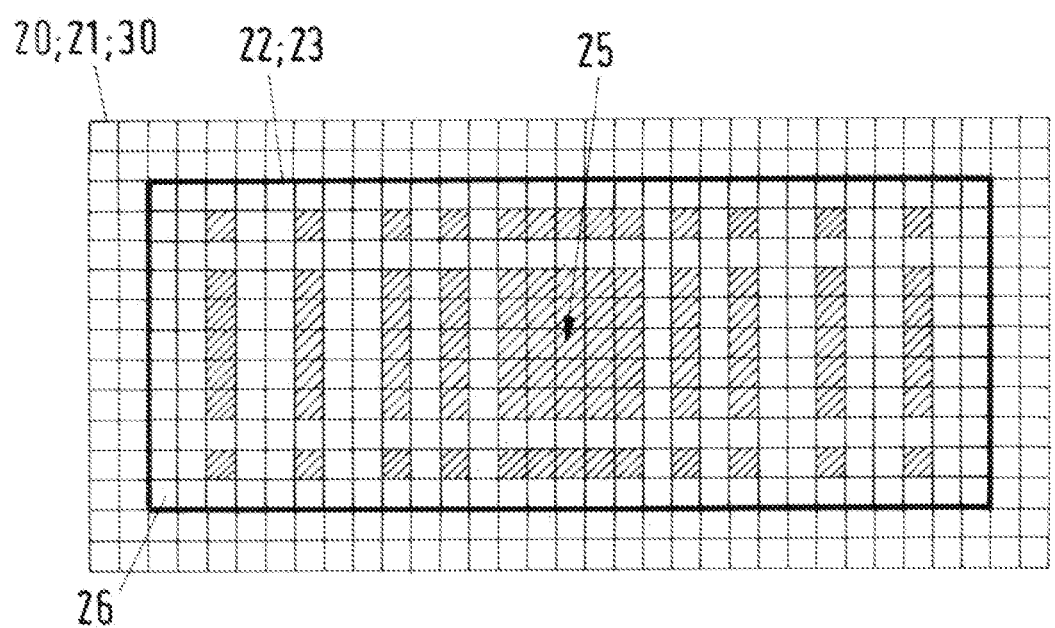
FIG. 4 shows a schematic illustration for elucidating a further embodiment of the visualization system and the method.

This is shown schematically in FIG. 4. In particular, provision can be made for the resolution to be reduced to an ever-greater extent, the further a pixel 26 is away from an image center 25 of the image excerpt 22. For the image excerpt 22 shown, a resolution is reduced to such an extent that information is only transmitted for the hatched pixels 26. By contrast, the non-hatched pixels 26 are determined by interpolation between the hatched pixels 26. Edge regions are then displayed at a lower resolution than regions in the image center 25.

Provision can further be made for changes in the registered viewing direction 10 which are above a specified threshold 17 (FIG. 1) to be recognized, with the changes above the specified threshold 17 remaining unconsidered when defining the image excerpt 22 and/or when changing the position of the registration device 2. To this end, the control device 3 determines, for example on the basis of the viewing direction signal 11, the size of a temporal change in the registered viewing direction 10 and compares the temporal change to the specified threshold 17. By way of example, the specified threshold 17 is stored in the memory 3-2 and can be specified, for example, in the form of a maximum number of pixels per unit time (e.g., at most 500 pixels per unit time). Provision can be made for the specified threshold 17 to be able to be specified by the user 40.

The visualization system 1 and the method allow the amount of data transmitted to the visualization device 4 to be reduced but nevertheless allow the complete registration region 20 to be provided in the full resolution of the registration device 2. In particular, the visualization system 1 and the method allow a field of view registrable by means of the display device 5 of the visualization device 4 to be adapted dynamically on the basis of the viewing direction of the user. Defining the image excerpt 22 on the basis of the viewing direction facilitates, in particular, an intuitive adjustment of the image excerpt 22, in particular on the basis of a registered relative position of the head and/or on the basis of a registered line of sight. As a result, the use of the visualization system 1 can be improved, in particular configured more intuitively, in relation to a workflow. A further advantage is that the registration device 2 need only be moved if the image excerpt 22 is located outside of the first image size 21 of the video data stream 30. This can avoid or at least reduce in terms of number the movement of the registration device 2 and disturbing effects on the displayed image excerpt 22, for example jittering or post oscillations, accompanying this.

Figure 5:
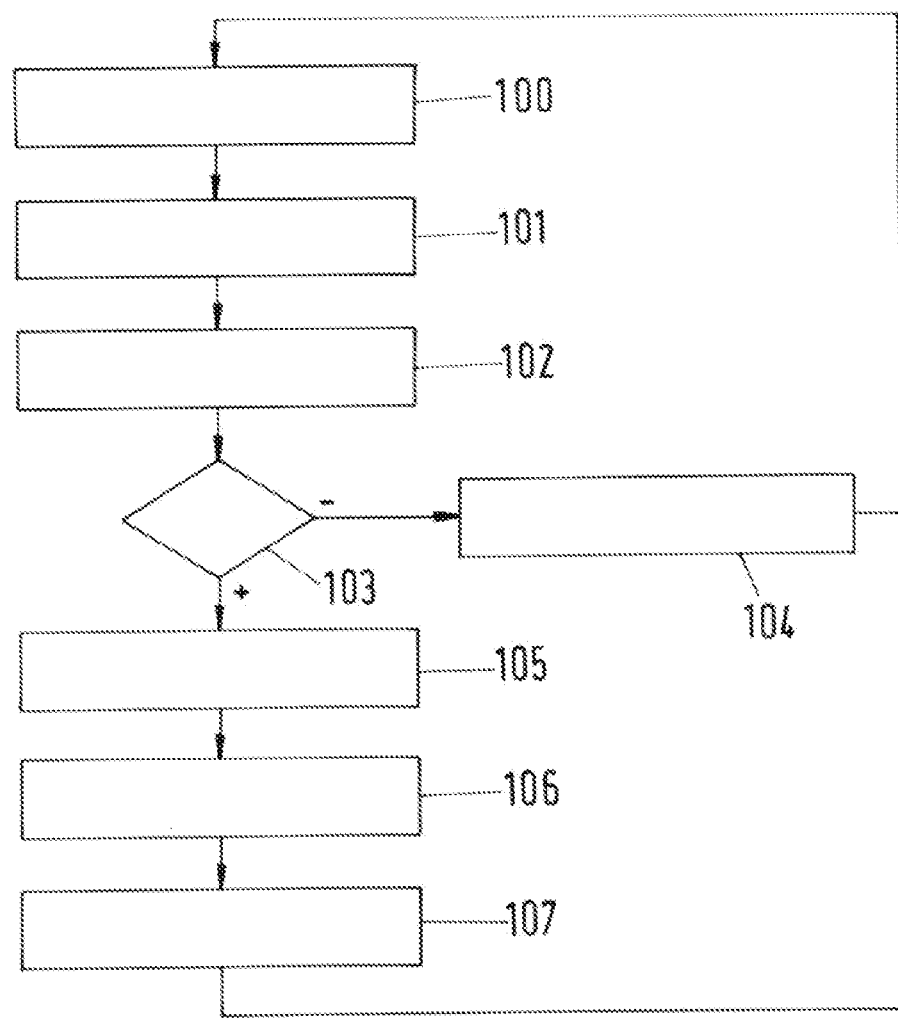
FIG. 5 shows a schematic flowchart of an embodiment of the method for operating a visualization system during a surgical application.

Shown in FIG. 5 is a schematic flowchart of an embodiment of the method for operating a visualization system in a surgical application.

In a measure 100, a registration region is registered by means of a registration device of the visualization system, wherein the registration device provides as an output a video data stream with a first image size and transmits said video data stream to a control device of the visualization system.

In a measure 101, a viewing direction of a user of a head-mounted visualization device (e.g., an HMD or AR glasses) of the visualization system is registered by means of a sensor system arranged at the visualization device. As an alternative or in addition thereto, the sensor system can also be arranged elsewhere. In particular, the relative position of the head of the user and/or a line of sight of the user is registered in order to determine the viewing direction therefrom.

In a measure 102, an image excerpt of the video data stream with a second image size that has been reduced in relation to the first image size is defined on the basis of the registered viewing direction. A center of the defined image excerpt in this case corresponds, in particular, to the registered viewing direction.

In a measure 103, a check is carried out as to whether the defined image excerpt is located completely within the registration region or the video data stream. Should this not be the case, provision is made in a measure 104 for a position of the registration region of the registration device of the visualization system to be altered. In particular, the change is implemented in such a way in this case that the defined image excerpt is subsequently located in an image center of the altered registration region. Following measure 104, there is a return to measure 100.

By contrast, if the result of measure 103 is that the defined image excerpt is located completely within the registration region, the control device generates the image excerpt from the video data stream in a measure 105 and provides, in particular, a video data stream reduced to the image excerpt.

In a measure 106, the provided image excerpt of the video data stream is transmitted via a communications link to the head-mounted visualization device.

In a measure 107, the transmitted image excerpt is displayed on a display device of the visualization device.

Subsequently, measures 100-107 are repeated such that a user is continuously provided with an image excerpt on the basis of a current viewing direction. By way of the viewing direction it is possible in this case to intuitively control which image excerpt is defined, generated and displayed on the display device.

LIST OF REFERENCE SIGNS

1 Visualization system
2 Registration device
2-1 Camera
2-2 Actuator system
3 Control device
3-1 Computing device
3-2 Memory
3-3 Interface
3-4 Interface
3-5 Interface
3-6 Interface
4 Visualization device
5 Display device
6 Sensor system
7 Communications link
10 Viewing direction
11 Viewing direction signal
15 Control signal
16 Minimum duration
17 Threshold
20 Registration region
21 First image size
22 Image excerpt
23 Second image size
25 Image center
26 Pixel
30 Video data stream
40 User
100-107 Measures of the method
A Point (corresponding to the viewing direction)
B Point (corresponding to the viewing direction)

The invention claimed is:

1. A method for operating a visualization system in a surgical application, the method comprising:
providing, by a registration device of the visualization system, a video data stream with a first image size as an output,
registering, by a sensor system, a viewing direction of a user,
generating an image excerpt of the video data stream, the image excerpt being a cropped portion of the video data stream, with a second image size smaller than the first image size, that is defined within the video data stream based on, and tracks any changes in, the registered viewing direction of the user,
transmitting the image excerpt to a head-mounted visualization device via a communications link, and
displaying the image excerpt on a display device of the head-mounted visualization device.

2. The method as claimed in claim 1, wherein the image excerpt is only defined if the registered viewing direction remains constant for a specified minimum duration.

3. The method as claimed in claim 1, wherein a relative position of a head of a user of the visualization device is registered by means of the sensor system, wherein the viewing direction is determined in consideration of the registered relative position of the head.

4. The method as claimed in claim 1, wherein a line of sight is registered by the sensor system, wherein the viewing direction is determined in consideration of the registered line of sight.

5. The method as claimed in claim 1, wherein a position of a registration region of the registration device of the visualization system is altered provided the defined image excerpt is located at least partly outside of a region which is imaged in the video data stream and which corresponds to the registration region of the registration device and the first image size.

6. The method as claimed in claim 1, wherein a resolution of the defined image excerpt is reduced, at least for a portion of the defined image excerpt, prior to the transmission to the visualization device.

7. The method as claimed in claim 6, wherein the resolution is reduced to an ever-greater extent, the further a pixel is away from an image center of the image excerpt.

8. The method as claimed in claim 1, wherein the image excerpt is defined upon startup and/or upon a reset of the visualization system to be an image center of the video data stream.

9. The method as claimed in claim 1, wherein changes in the registered viewing direction which are above a specified threshold are recognized, with the changes above the specified threshold remaining unconsidered when defining the image excerpt and/or when changing a position of the registration device.

10. A visualization system for a surgical application, comprising:
a registration device,
a communications link,
a head-mounted visualization device with a display device, a sensor system which is configured to register a viewing direction of a user, and a control device, wherein the registration device is configured to provide a video data stream with a first image size as an output, wherein the control device is configured to generate an image excerpt of the video data stream, the image excerpt being a cropped portion of the video data stream, with a second image size smaller than the first image size, that is defined within the video data stream based on, and tracks any changes in, the registered viewing direction of the user, and to transmit said image excerpt via the communications link to the visualization device, and wherein the visualization device is configured to display the transmitted image excerpt on the display device.

\* \* \* \* \*